(12) United States Patent
Holley et al.

(10) Patent No.: US 8,493,213 B2
(45) Date of Patent: Jul. 23, 2013

(54) SYSTEM AND METHODS FOR LOCATING MOBILE DEVICES USING LOCATION AND PRESENCE INFORMATION

(75) Inventors: Kerrie L. Holley, Montara, CA (US); Michael E. Piotrowski, Spokane, WA (US); Sri Ramanathan, Lutz, FL (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/426,995

(22) Filed: Mar. 22, 2012

(65) Prior Publication Data
US 2012/0190327 A1  Jul. 26, 2012

Related U.S. Application Data

(63) Continuation of application No. 12/421,284, filed on Apr. 9, 2009, now Pat. No. 8,264,352.

(51) Int. Cl.
*G08B 13/14* (2006.01)
(52) U.S. Cl.
USPC ............. 340/568.1; 340/539.11; 340/539.13; 340/541; 340/825.49
(58) Field of Classification Search
USPC ................. 340/568.1, 539.1, 539.11, 539.13, 340/541, 571, 573.4, 825.49, 825.69; 455/456, 455/456.1, 456.2, 456.3, 466
See application file for complete search history.

(56) References Cited

U.S. PATENT DOCUMENTS

| | | | |
|---|---|---|---|
| 5,731,785 A | 3/1998 | Lemelson et al. | |
| 5,748,084 A | 5/1998 | Isikoff | |
| 5,793,283 A | 8/1998 | Davis | |
| 6,813,498 B1 | 11/2004 | Durga et al. | |
| 7,205,895 B2 | 4/2007 | Outlaw et al. | |
| 7,546,141 B2 | 6/2009 | Leon et al. | |
| 7,849,161 B2 | 12/2010 | Koch et al. | |
| 7,872,578 B2 | 1/2011 | Sher | |
| 2002/0034953 A1 | 3/2002 | Tricarico | |
| 2003/0117316 A1* | 6/2003 | Tischer | 342/357.1 |
| 2004/0204181 A1* | 10/2004 | Cromer et al. | 455/574 |
| 2005/0222933 A1* | 10/2005 | Wesby | 705/36 |
| 2005/0227717 A1* | 10/2005 | Cantini et al. | 455/509 |
| 2007/0080824 A1 | 4/2007 | Chen et al. | |
| 2008/0048856 A1* | 2/2008 | Culpepper et al. | 340/539.13 |
| 2008/0098483 A1 | 4/2008 | Bhansali et al. | |

OTHER PUBLICATIONS

Notice of Allowance for corresponding U.S. Appl. No. 12/421,284 dated May 2, 2012.
Office Action for related U.S. Appl. No. 13/431,357 dated Dec. 4, 2012.
Final Office Action dated Apr. 8, 2013 in U.S. Appl. No. 13/431,357, 7 pages.

* cited by examiner

*Primary Examiner* — Hung T. Nguyen
(74) *Attorney, Agent, or Firm* — Matthew Chung; Roberts Mlotkowski Safran and Cole, P.C.

(57) ABSTRACT

A location based service and method configured to provide recovery assistance for a misplaced or stolen mobile device. The location based system and method is configured to locate (recover) high value mobile devices using location, presence and other IMS (IP Multimedia Subsystem) based telecommunications network assets. The method includes leveraging location dips performed for other services to drive a recovery process for a mobile device to thereby reduce resource overhead on a location platform; locating the mobile device using the location dips performed for other services; and sending a notification to a subscriber of the location of the mobile device for recovery of the mobile device.

22 Claims, 6 Drawing Sheets

SYSTEM AND METHODS FOR LOCATING MOBILE DEVICES USING LOCATION AND PRESENCE INFORMATION

CROSS REFERENCE TO RELATED APPLICATIONS

The present application is a continuation application of U.S. application Ser. No. 12/421,284, filed on Apr. 9, 2009 (U.S. Pat. No. 8,264,352), the contents of which are incorporated by reference in its entirety herein.

FIELD OF THE INVENTION

The invention generally relates to location based services and, in particular, to a location based system and method that is configured to locate (recover) high value mobile devices using location, presence and other IMS (IP Multimedia Subsystem) based telecommunications network assets.

BACKGROUND

Faced with an increasingly difficult challenge in growing both average revenue per user (ARPU) and numbers of subscribers, wireless carriers are trying to develop a host of new products, services, and business models based on data services. One such service is location-based services, which provide information specific to a location including actual locations of a user. It is expected that location based services will generate additional business for the carrier, from both the mobile user and content providers.

For the mobile user as well as the service provider, location-based services offer many opportunities. For example, location-based services can increase revenue of the service provider, e.g., network carrier, while improving services to end users, e.g., mobile users. Some examples of location-based services that can be provided to the mobile user include:

Providing the nearest business or service, such as an ATM or restaurant;
Providing alerts, such as notification of a sale on gas or warning of a traffic jam;
Providing weather reports which are germane to the location where the user is using the mobile device; and/or
Providing advertisements to end users, e.g., recipients, etc.

For the network carrier, location-based services provide value add by enabling services such as:

Resource tracking with dynamic distribution (e.g., taxis, service people, rental equipment, doctors, fleet scheduling, etc.); and
Proximity-based notification (push or pull) (e.g., targeted advertising, buddy list, common profile matching (dating), and automatic airport check-in).

Currently, wireless companies already have the ability to determine a person's location through various mechanisms. For example, some wireless devices are GPS enabled allowing them to use satellites to determine their location. In other cases, cell tower triangulation or single cell tower location is used to determine location. For more coarse-grained depths using a web browser, an IP address lookup table correlates the IP address with a specific region. This is useful if a service does not need to know the exact location of an individual, like a weather service.

However, with the advent of mobile devices such as cellular telephones, wireless personal digital assistants ("PDAs"), portable computers, and other mobile or wireless communication devices, it is becoming increasingly more common for a user to misplace and even lose the mobile device. Also, with the increased computing capacity on these electronic assets, it is now possible and even commonplace to have very valuable information stored on such devices. For example, mobile telephones can store business data such as directories of names, addresses and telephone numbers, customer or client names and contacts, to a host of other important and proprietary information. In the event that a high value device is lost or stolen, in addition to the cost of the device, losses occur due to the loss of such information or the loss of control over such stored information. Accordingly, being able to rapidly recover the misplaced device is of considerable business benefit to the subscriber.

SUMMARY

In a first aspect of the invention, a computer implemented method comprises leveraging location dips performed for other services to drive a recovery process for a mobile device to thereby reduce resource overhead on a location platform. The method further comprises locating the mobile device using the location dips performed for other services. In addition, the method comprises sending a notification to a subscriber of the location of the mobile device for recovery of the mobile device.

In another aspect of the invention, a computer program product comprises a computer usable storage medium having readable program code tangibly embodied in the storage medium. The computer program product is operable to: receive continuous notifications from an agent residing on a mobile device; determine a location of the mobile device based on the continuous notifications; and send the location to a subscribing user in order to recover the mobile device.

In another aspect of the invention, a method for providing location information to one or more users comprises providing a computer infrastructure. The computer infrastructure is operable to: leverage location dips performed for other services to drive a recovery process for a mobile device; locate the mobile device using the location dips performed for the other services; determine a routing path requested by a subscribing user to provide a message to the subscribing user on a requested device; and send a notification with the message to the subscribing user on the determined routing path to inform the subscribing user on the requested device of the location of the mobile device for recovery thereof.

In yet another aspect of the invention, a mobile device comprises an agent configured to provide continuous notifications regarding location information of the device to an infrastructure and configured to take into account a battery life of the mobile device when providing the continuous notifications such that fewer notifications will be provided per time period for a battery with lower life expectancy than a battery with higher life expectancy.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
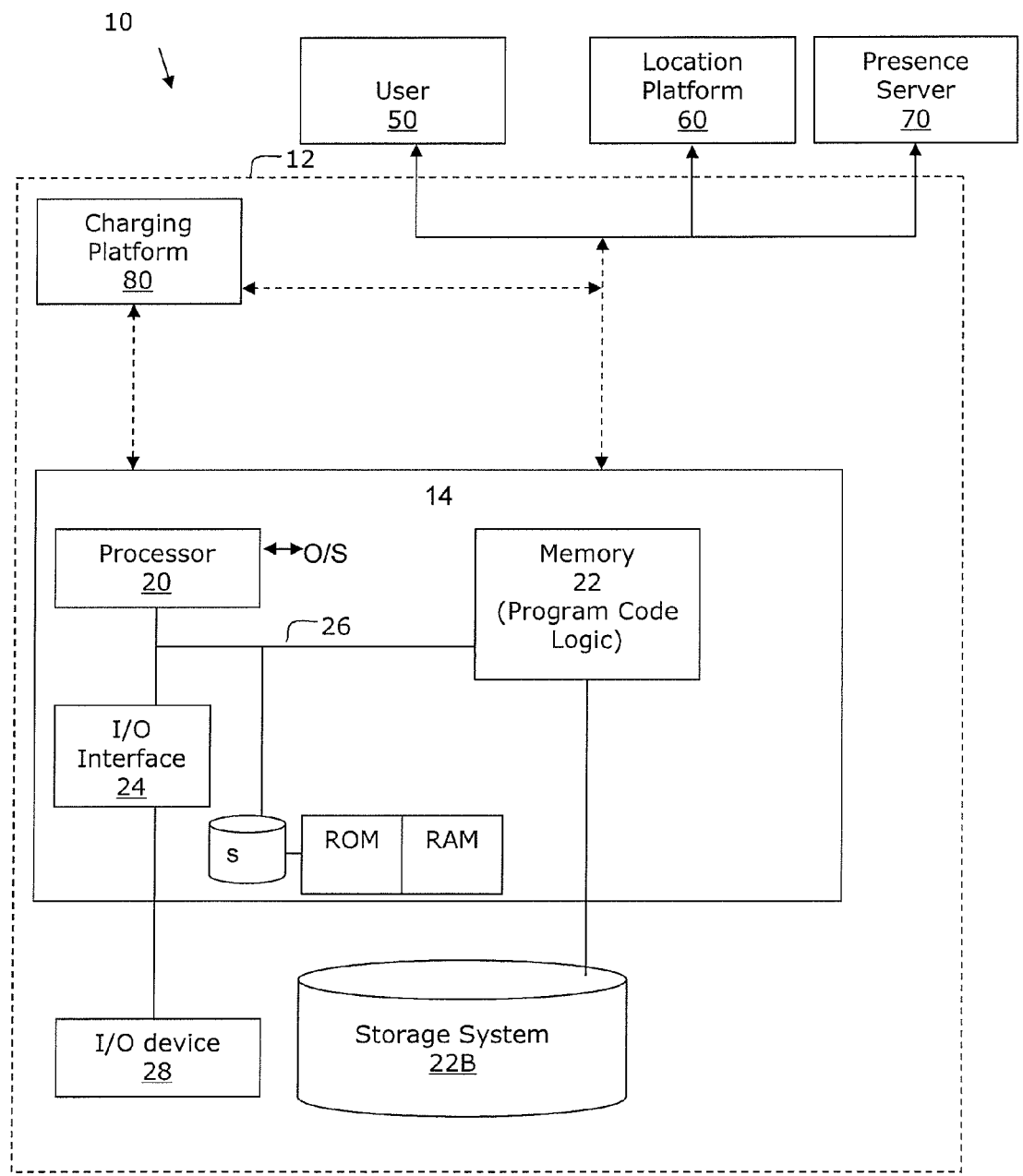
FIG. 1 shows an illustrative environment for implementing processes in accordance with the invention.

The invention generally relates to location based services and, in particular, to a location based system and method that is configured to locate (recover) high value mobile devices using location, presence and other IMS (IP Multimedia Subsystem) based telecommunications network assets. More specifically, the system and method of the present invention uses location based information to locate and recover SIP (Session Initiation Protocol) and non SIP-enabled handsets (devices) using an IMS (IP Multimedia Subsystem) compliant presence server, a location platform and other service provider network hosted elements.

Advantageously, by implementing the present invention it is possible to leverage location information generically to update a presence document in the network. Also, as discussed below, significant savings can be obtained using the present invention by not having to frequently query the location platform in order to locate or recover a device, significantly improving the feasibility of implementation of this service as a consumer facing revenue generating service. For example, the present invention ensures that both IMS and non-IMS devices are accounted for in the recovery process by maintaining track of the state (presence) of the device and using such information to aid in recovery operations. More specifically, in embodiments, a SIP A/S (SIP Application Server) can use pattern matching to determine if the device is in a known location at a certain time, e.g., certain time of the day. In other words, the present invention can use behavior that is repetitive (e.g., such as a person driving along a certain route (or routes) every day, being at work and at home at predictable intervals, etc.) to drive sensing capabilities of the system and method of the present invention. In additional embodiments, the device can provide notifications to the infrastructure, based on predetermined time periods, battery life, etc. Accordingly, in embodiments, to optimize the usage of the location platform, highly predictable routes, location/time period matches and notifications can be implemented in order to cause less location fixes being generated on behalf of the subscriber to thereby reduce location platform usage and produce significant savings, while optimizing value derived by the service.

It is also possible to leverage a subscriber driven recovery model, saving significant costs for the carrier infrastructure, which is already heavily burdened by existing care traffic. This is possible by allowing subscribers to initiate the process of controlling and initiating recovery services by, for example, providing subscriber initiated notifications on a continuous basis. Additionally, the present invention will not start tracking of location and presence just as a result of a subscriber calling into the network; instead, the present invention continuously leverages existing presence and location traffic to monitor devices, allowing for the actual recovery process to be significantly increased by using historical information. For example, the present invention can use existing services that require location information from the devices such as, for example, weather services subscribed to by the user, in order to track the mobile device. This information would be received by the system of the present invention for processing.

The present invention also supports a 3GPP IMS compliant charging architecture via diameter integration into an IMS compliant CCF. The SIP A/S (SIP Application Server) drives this revenue generating service. Also, it is possible to cover both devices that are not GPS enabled as well as A-GPS assisted devices that have a valid data services network connection. This approach allows client side driven presence document updates which also significantly improves operational efficiencies.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM),
an optical storage device,
a transmission media such as those supporting the Internet or an intranet, and/or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

More specifically, FIG. 1 shows an illustrative environment 10 for managing the processes in accordance with the invention. To this extent, the environment 10 includes a server 12 that can perform the processes described herein. In particular, the server 12 includes a computing device 14. The computing device 14 and/or server 12 can be resident on a carrier network infrastructure or other third party service provider (any of which is generally represented in FIG. 1). In embodiments, the server 12 is a SIP A/S (Recover SIP Application Server) that drives the services described herein. By using this computing device 14 and/or server 12, the network carrier will not have to make any significant infrastructure investments, as the preexisting infrastructure is utilized with the present invention.

The computing device 14 and/or server 12 includes the computer program code (program code logic) configured to make computing device 14 and/or server 12 operable to perform the services described herein. The program control can be one or more computing modules implemented in memory 22A, which is serviced and/or maintained by a service provider such as, for example, a network carrier. The present invention specifically supports IMS networks, which is relevant as all the wireless and wired carriers are moving to an IMS based reference architecture in their core networks. Also, implementations of the present invention integrates seamlessly into an existing IMS network while providing a mechanism to integrate with existing sources of content that may not SIP enabled, as can be implemented by those of skill in the art.

The infrastructure 10 also includes a location platform 60 configured to provide a mechanism for delivering location information of a device (e.g., subscriber 50) using a location based system. In examples, the location information of the device 50 may be obtained by, e.g., A-GPS, GPS or triangulation methodologies, all of which are known to those of skill in the art such that further explanation is not required herein for an understanding of the invention. In embodiments, the location platform 60 can provide location information for devices 50 that are not GPS aware to perform both cell sector and precise fixes, while optimizing network resource usage. The present invention, e.g., SIP A/S 12, can also leverage location dips being performed for the subscriber (e.g., device 50) for other services to drive this location and retrieval service.

In embodiments, the location capabilities can be embedded in the core telecommunications IMS and non-IMS network, e.g., server 12, to continuously track the location of the device 50 and its presence using, for example, a presence server 70. That is, in embodiments, the location platform 60 can be a carrier housed location platform, resident on the SIP A/S 12 or other carrier infrastructure as should be understood by those of ordinary skill in the art.

It is contemplated that the device 50 can be a SIP (Session Initiation Protocol) or non SIP-enabled device using the location platform 60, the presence server 70, e.g., IMS (IP Multimedia Subsystem) compliant presence server, and other service provider network hosted elements as discussed herein such as, for example, the SIP A/S 12. In additional embodiments, the device 50 can include all existing components of a conventional mobile device, while incorporating an agent into the device to assist with optimization for both GPS devices as well as non AGPS enabled devices, over IMS and non-IMS networks. The agent may also be used to optimize notification rates provided by the device (and received by the SIP A/S) on an ongoing, continuous basis, e.g., a ping rate based on battery capacity left in the device. For example, the agent on the device 50 can trigger a location notification to the subscriber in order to locate the device. This notification can be optimized based on the battery level of the device, to maximize battery life. Also, the agent can be configured to start a specific sequence of recovery actions on behalf of the subscriber when an incorrect unlock code is entered into the device a certain number of consecutive times.

In embodiments, the SIP A/S 12 does not require random transmitting of state changes and location information from the device 50 (for AGPS devices) when triggered into "panic" mode, e.g., a mode when the device has been misplaced by the user. Instead, in embodiments, the recovery process is not a result of a request from a subscribing user, but instead, the device can be constantly monitored, e.g., tracked, in order to optimize efficiency during subsequent recovery. In embodiments, to optimize efficiency of the system, the monitoring can be accomplished by using pattern matching based on usage/location and time windows to drive the recovery process. For example, in embodiments, the SIP A/S 12 can use pattern matching to determine if the device is in a known location at a certain time, e.g., certain tile of the day. In other words, the SIP A/S 12 can use repetitive behavior which is stored in a database, e.g., storage system 22B, to drive the sensing capabilities. In embodiments, the repetitive behavior may be determined by analyzing previously obtained location information to determine repetitions of both time and location. Alternatively, a user can simply save frequented location and time information in the database, e.g., storage system 22B. Also, as noted above, the device 50 can provide notifications, via an agent, on a periodic or constant basis. Accordingly, in embodiments, highly predictable routes and/or location/time periods can be used to optimize the usage of the location platform in order to cause less location fixes being generated on behalf of the subscriber. This, in turn, will significantly increase overhead savings.

In embodiments, the presence server 70 maintains track of the status of the device 50 (including its location as an attribute of a presence document associated with the handset) by, for example:

Publishing (via a SIP Publish) a status to, e.g., a log, when the device 50 is turned off (e.g., via an agent on the device 50). For non-IMS devices, an HLR based trigger is used via an IS-41 SIP bridge. (See, e.g., FIG. 4.)

Logging when the device 50 is turned on (SIP Register and SIP Publish). For non-IMS devices, the same HLR bridge interface (IS-41) can be used to support publications to the presence server 70. (See, e.g., FIG. 4.)

Logging a data or voice session (SIP Publish), both during establishment of the session and at the termination of the session.

Periodic geographic positioning of the device (e.g., more frequent cell sector fixes and less frequent precise fixes). To optimize location dips carried out for this purpose, the location information from other service invocations that attempt to locate the device can be reused. For example, if the subscriber uses a location enabled weather service to obtain weather information for the user's location, that location fix is used to update the presence document with the location information, using a SIP bridge from the service to the presence server. (See, e.g., FIG. 4 or FIG. 5.)

For advanced A-GPS devices, an agent on the device can update the presence document using a SIP Publish periodically, after doing a location fix via standard location determination semantics. (See, e.g., FIG. 3 or FIG. 5.)

Reusing the presence document to store location information, which is updated anytime a device makes a location request for any service.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a display of a wireless handheld device or other device in which the subscriber has requested routing of a notification or message.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, a charging platform 80 is maintained to provide charging models to charge for services rendered. The charging platform 80 may be maintained, deployed, created and/or serviced by the service provider. The charging platform 80 is designed to generate a charging record for services rendered to a subscriber 50 or other users requesting location information to retrieve a misplaced or stolen mobile device. In embodiments, the service provider can calculate an amount to be charged, based on many different considerations and generate the charging record to be sent to the charging platform 80. In turn, the charging platform 80 can generate an invoice and/or deduct a usage charge from an account of the subscriber.

In embodiments, the invention provides a business method that performs the steps of the invention on a subscription, advertising, and/or fee basis. That is, a service provider, such as a Solution Integrator or location based service, could offer to perform the processes described herein. In this case, the service provider can create, maintain, deploy, support, etc., the computer infrastructure that performs the process steps of the invention for one or more customers. The customers may be, for example, a mobile user or a third party requesting location information. In return, the service provider can receive payment from the customer(s) under a subscription and/or fee agreement and/or the service provider can receive payment from the sale of advertising content to one or more third parties.

Exemplary Architecture

Figure 2:
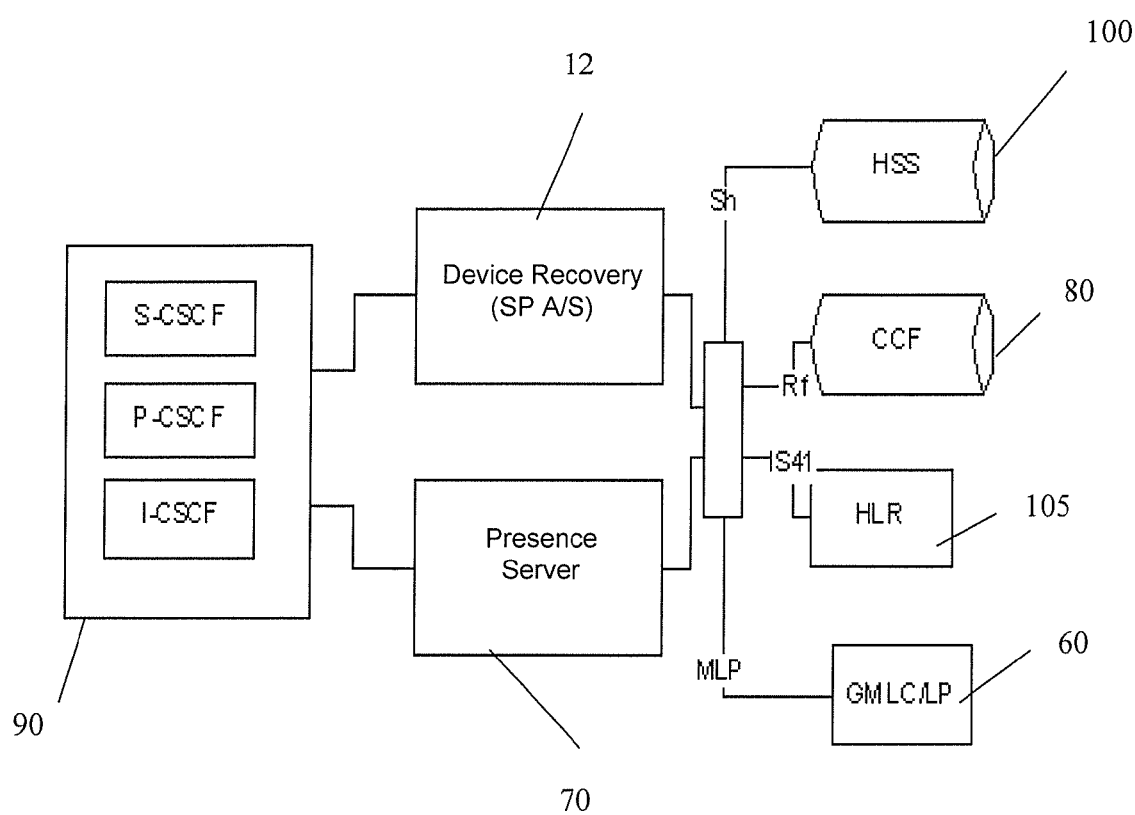
FIG. 2 shows a high level architecture depicting IMS components which interface with a Device Recovery Application Server (A/S) in the IMS network in accordance with aspects of the present invention.

FIG. 2 is a high level architecture for implementing processes in accordance with the invention. More specifically, FIG. 2 shows IMS components that interface with an IMS network 90 in accordance with the invention. The IMS network 90 includes Call Session Control Functions (CSCF) to provide session control for subscribers accessing services within the IMS network 90. In essence, the CSCF is a SIP Server with all traffic coming to the SIP A/S 12 (e.g., device recovery SIP A/S) and presence server 70 via the Serving Call Session Control Function (S-CSCF) using an ISC/SIP interface.

Also, the IMS network 90 and more specifically the SIP A/S 12 has responsibility for interacting with network databases such as the Home Subscriber Server (HSS) 100, which is a master user database that supports the IMS network entities that handle calls. The HSS 100 can be the storage system 22B of FIG. 1. The HSS 100 contains the subscription-related information (e.g., user profiles), performs authentication and authorization of the user, and can provide information about the user's physical location. The HSS 100 drives subscriber profile information, including a user subscription to the service of the present invention, using the Sh protocol.

In embodiments, offline charging is applied to users who pay for their services periodically (e.g., at the end of the month). Online charging, also known as credit-based charging, is used for prepaid services, or real-time credit control of postpaid services. For offline charging, all SIP network entities (P-CSCF, I-CSCF, S-CSCF, BGCF, MRFC, MGCF, AS) involved in the session use the Diameter Rf interface to send accounting information to a Charging Collector Function (CCF) (charging platform) 80 located in the same domain. The CCF 80 collects information and builds a Call Detail Record (CDR), which is sent to the billing system (BS) of the domain. For online charging, the S-CSCF can talk to a Session Charging Function (SCF) (also represented by reference numeral 80).

FIG. 2 further shows a Home Location Register (HLR) 105. The HLR 105 is a central database that contains details of each mobile device subscriber that is authorized to use the GSM (Global System for Mobile communications) core network. The HLR 105 may be the storage system 22B of FIG. 1. The HLR 105 stores details of every SIM card issued by the carrier, which is stored for as long as a subscriber remains with the carrier. As should be known by those of skill in the art, the HLR 105 directly receives and processes MAP transactions and messages from elements in the GSM network, for example, the Location Update messages received from the device 50. A GM LC/LP component 110 is also provided by the present invention. As should be understood, a GM LC/LP 60 is a GM LC/LP Gateway Mobile Location Center also called the Location Platform.

Figure 3:
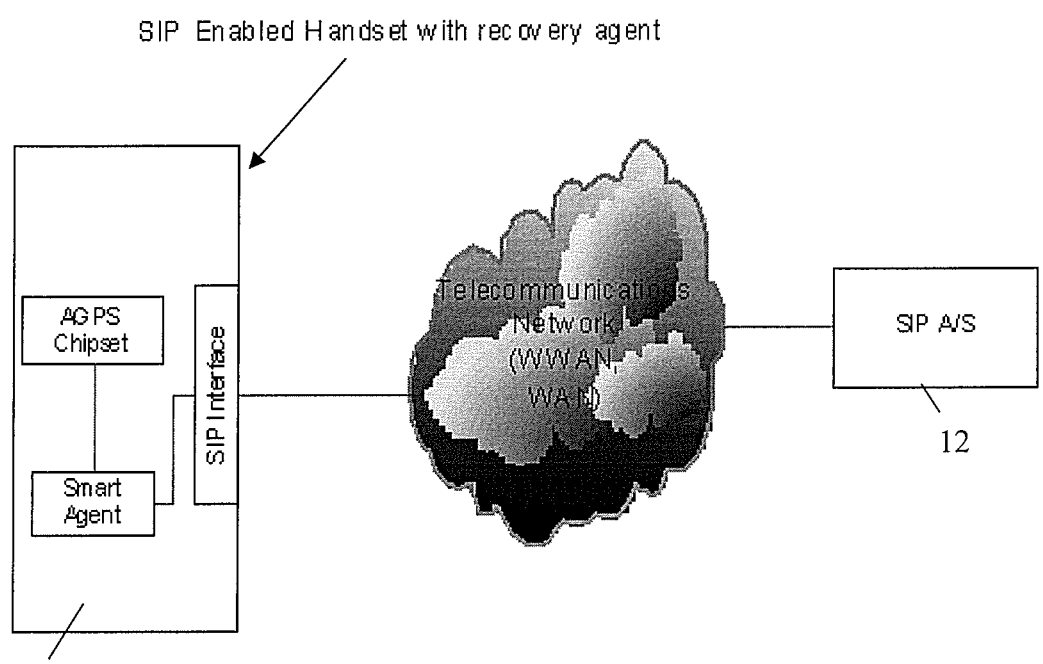
FIG. 3 shows components in an agent enabled AGPS chipset based device that performs location pushes to a network in accordance with aspects of the present invention.

FIG. 3 shows components in an agent enabled AGPS chipset based handset that can perform location pushes to the network in accordance with aspects of the present invention. More specifically, FIG. 3 depicts the components in an agent enabled AGPS chipset based device 50 that performs location pushes to the network without relying on the telecommunications network. In embodiments, the device 50 is a SIP client to the A/S server 12, significantly leveraging the device's inherent capabilities while simultaneously reducing the need for network resources (especially with respect to the location platform). As should be understood, the agent can be configured to provide notifications to the SIP A/S 12 on a periodic basis to inform the SIP A/S 12 of the device location. In embodiments and as discussed with reference to FIGS. 5 and 6, for example, the agent can provide notifications on a predetermined basis based on battery capacity in order to optimize performance.

Figure 4:
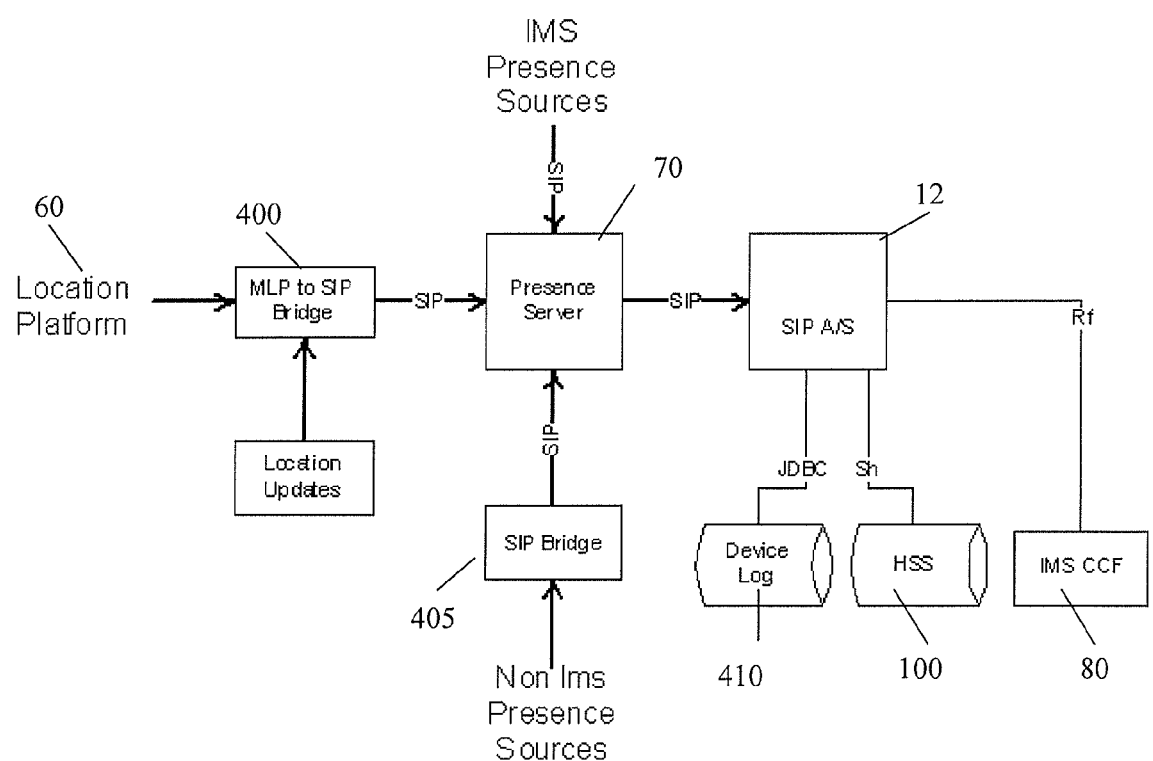
FIG. 4 is a high level block diagram showing location information converted to a node in a presence document for implementing processes in accordance with aspects of the present invention.

FIG. 4 represents a high level block diagram in accordance with aspects of the present invention. FIG. 4 may also represent a high level flow diagram to provide processes in accordance with aspects of the invention. More specifically, FIG. 4 graphically shows how location information (from a location platform 60) is converted to a node in the presence document, by leveraging a MLP (Meridian Lossless Packing) to SIP bridge 400 and configuring the MLP to SIP bridge 400 as a location client and a presence source. Additionally, FIG. 4 shows a SIP bridge 405 (HLR bridge interface (IS-41)) used with non-IMS devices to track terminal status. That is, for non-IMS devices, the HLR bridge interface (IS-41) 405 can be used to support publications to the presence server 70. In embodiments, the presence document can be reused to store location information, which is updated anytime a device makes a location request for any service. The presence document is provided to the SIP A/S 12 for recovery of the device.

Also, in the present invention, a model is contemplated by which all location requests made for other purposes can be repurposed for device recovery as well, allowing for significant optimization by reducing the amount of traffic going to the already typically taxed location platform and helping conserve valuable network resources. In embodiments, the A/S SIP 12 periodically performs allocation requests to track the device and updates the presence document created by the presence sever 70.

FIG. 4 also shows the HSS 100 and the charging platform 80 (e.g., IMS CFF). A device log 410 may also be used in order to: (i) publish (via a SIP Publish) a status to, e.g., the log 410, when the device 50 is turned off. (For non-IMS devices, an HLR based trigger is used via the IS-41 SIP bridge.); (ii) log when the device 50 is turned on (SIP Register and SIP Publish) and/or (iii) log a data or voice session (SIP Publish), both during establishment of the session and at the termination of the session.

Exemplary Processes

Figure 5:
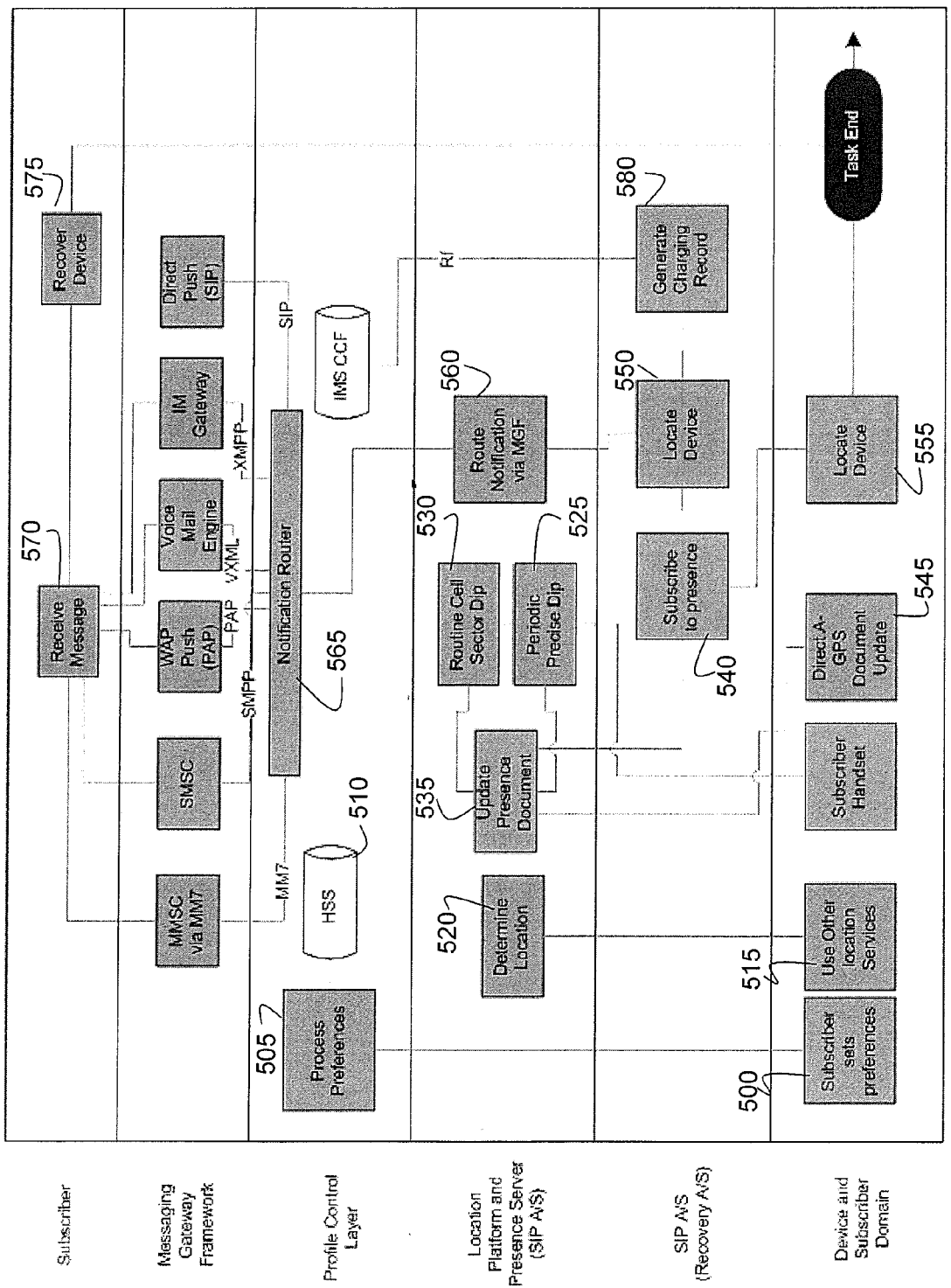
FIG. 5 is a flow diagram showing processes in accordance with aspects of the present invention.

FIG. 5 illustrates exemplary processes in accordance with the present invention. The steps of FIG. 5 may be implemented on the computer infrastructure of FIG. 1 or the architecture of FIG. 2 or the block diagram of FIG. 4, for example. The flow diagrams (swim lane diagrams) in FIG. 5 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagram, and combinations of the flow diagram illustrations can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1 or the architecture of FIG. 2 or the block diagram of FIG. 4, for example. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

FIG. 5 shows six roles: Device and Subscriber Domain, SIP A/S (Recovery A/S); Location Platform and Presence Server (SIP A/S); Profile Control Layer; Messaging Gateway Framework and Subscriber. At step 500, the subscriber sets preferences (after logging into the system). At step 505, the preferences will be processed in the profile control layer and, at step 510, will be stored in the master service profile (e.g., HSS) in the IMS network. The subscriber can also set up notification preferences. These notification preferences can be, for example, requests that notifications be delivered over different channels as required. At step 515, location fixes for other services can be used to update the presence document for the subscriber along with standard presence related changes. In embodiments, at step 520, the location platform will determine the location of the subscriber, associated with other services. The interactions can be performed by use of a standard browser based interface such as, for example, the I/O device 28 of FIG. 1.

At steps 525 and 530, the SIP A/S responsible for a subscribed service performs periodic or routine location requests (precise and cell sector dips), respectively, for the subscriber exclusively for the selected service. Tie can be performed, for example, if the location platform or the SIP A/S senses that location information is not being requested for the subscriber for other purposes. In embodiments, this is done only if necessary. Also, additional optimization may be provided by a service provider setting that determines how frequently to rely on the precise fix as opposed to the cell sector dip. At step 535, presence documents are updated, preferably in the same manner as the periodic or routing request updates are treated, even though in the case of the presence services, the SIP A/S (recovery A/S) is a standard "watcher" for subscribers who have subscribed to the recovery service. This is controlled to some extent by the pattern matching capabilities of the SIP A/S (recovery A/S), which relies on historical data to match locations to time windows for a certain time period, e.g., 24 hour period.

At step 540, the SIP A/S (recovery A/S) subscribes to the presence updates. At step 545, the device and subscriber domain directs A-GPS document updates to the presence documents. At step 550, the device is located using the SIP A/S (recovery A/S). At step 555, the location of the device is provided at the device and subscriber domain. At step 560, the location of the device is routed via a messaging gateway framework (MGF), for example, to the profile control layer. These steps demonstrate added processing for A-GPS devices (both SIP and non SIP enabled) that are able to periodically send location information to the location platform and presence server which is then aggregated in the presence server and notified (standard SIP semantics) to the recovery A/S. These steps may also encompass the processing that occurs when a device lookup is initiated by the subscriber using a standard interface.

At step 565, a router in the profile control layer routes the notification to one of several gateways in the messaging gateway framework. These gateways can be, for example, MMSC (Multimedia Messaging Service) via MM7, Short Message Service Center (SMSC), Wireless Application Protocol (WAP) Push (PAP), voice mail engine, IM gateway and Direct Push (SIP). Thus, upon lookup resolution, the profile control layer routes makes a routing determination based on the subscriber profile as to where to send the notification and the channel to use, via the MGF. As should be understood, the routing of the message may be initiated by a notification received from the agent resident on the device. At step 570, the subscriber receives a notification, e.g., message, regarding the location of the device. At step 575, the subscriber recovers the device. At step 580, the SIP A/S (Recovery A/S) generates a charging record via the use of the IMS CCF in the profile control layer.

Exemplary Uses

Figure 6:
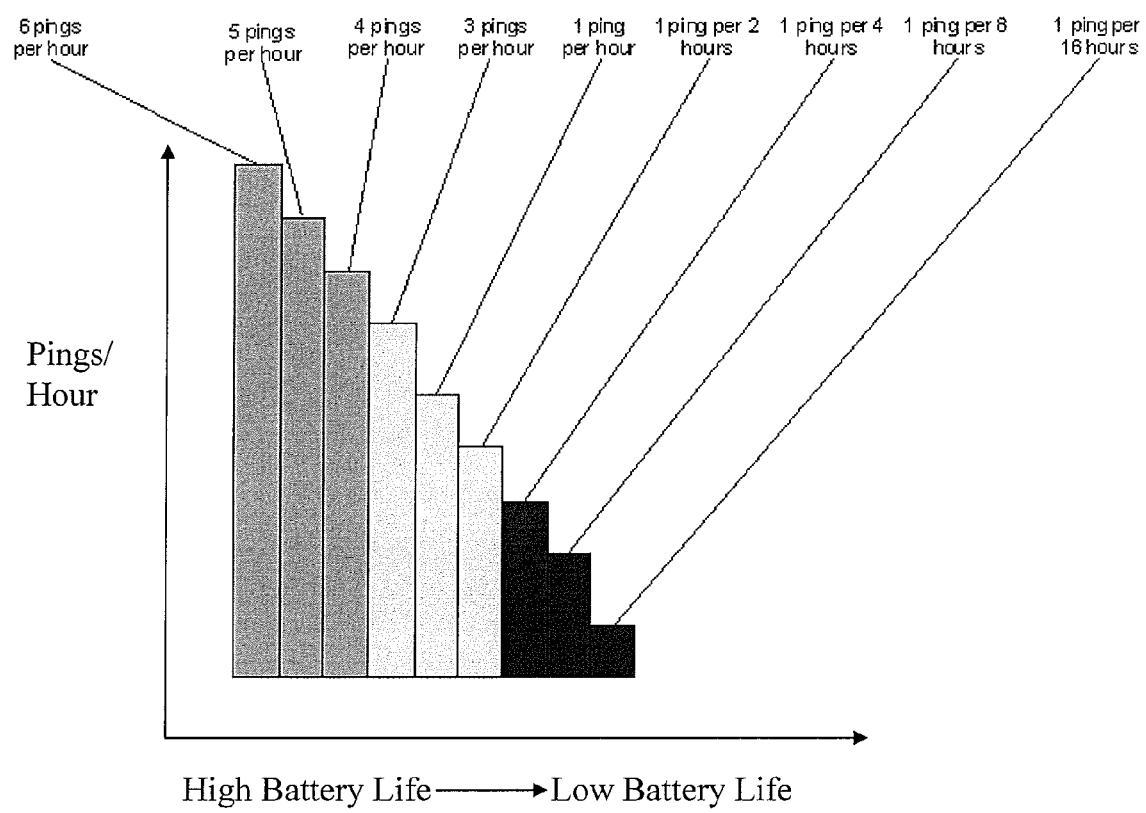
FIG. 6 shows a strategy for a smart agent notification from a device driven based on battery capacity left in the device in accordance with aspects of the present invention.

FIG. 6 shows a strategy for agent notification in accordance with aspects of the invention. As seen from FIG. 6, as an exemplary illustration, the rate of pings/hour is dependent on battery life of the device, e.g., the ping rate is driven based on battery capacity left in the device. In this way, it is possible to optimize the actual notifications sent to the network so as to prolong battery life, while continuing to provide value to the service. For example, the agent on the device can trigger a location notification to the subscriber using the data connection on the phone carrier delivery gateway infrastructure. The agent optimizes transmission of this information based on the battery level of the device, to maximize battery life. The notification, for example, can be 1 ping per sixteen hours on low battery capacity; whereas, 6 pings per hour may be provided by the agent of the device that has a high battery capacity. In embodiments, the example of FIG. 6 is based on an assumption that the device is not plugged into its charger outlet. The agent can be configured to start a specific sequence of recovery actions on behalf of the subscriber when an incorrect unlock code is entered into the device a certain number of consecutive times.

The following are examples implementing the present invention. These examples are only illustrative of many different scenarios and, as such, should not be considered a limiting feature of the present invention. By way of a first example, subscriber "A" owns a smart phone with critical data residing thereon. The subscriber "A" leaves the phone in a restaurant during lunch time. When subscriber "A" returns to work, subscriber "A" realizes that the phone has been misplaced. Due to the fact that subscriber "A" is a subscriber to the device recovery service, which subscriber "A" can access using a standard browser, it is now possible to locate the phone. For example, subscriber "A" requests location information of the telephone, which is retrieved by the service provider. The location can be based on a pattern matching or actual location information retrieved from the location platform. Once the location information is retrieved, the subscriber can return to the restaurant to retrieve the phone. The service provider in this case charges the subscriber "A" only when using the service.

In another example, subscriber "B" misplaces his phone, which upon the passage of some idle time, locks its screen. The phone is found by another subscriber, who tries to unlock the phone. After a few failed attempts, the agent on the phone triggers a location notification to the subscriber using the data connection on the phone carrier delivery gateway infrastructure. The agent optimizes transmission of this information based on the battery level of the device, to maximize battery life. Subscriber "B" may receive an email or SMS message on another registered device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A computer implemented method, comprising:
providing a computer infrastructure that is configured to:
leverage location dips performed for existing presence and location traffic services for purposes other than for a device recovery which can be repurposed in order to drive a recovery process for a mobile device thereby reducing resource overhead on a location platform;
utilize a carrier location platform to perform both cell sector and precise fixes;
use pattern matching based on usage/location of the mobile device during predetermined time periods to drive the recovery process and reduce the resource overhead on the location platform;
locate the mobile device using the location dips performed for other services; and
send a notification to a subscriber of the location of the mobile device for recovery of the mobile device.

2. The method of claim 1, wherein the location dips are performed by location capabilities embedded in a core telecommunications IMS and non-IMS network to continuously track the location of the mobile device on a periodic basis.

3. The method of claim 1, further comprising reusing presence information to store location information, which is updated anytime the mobile device makes a location request.

4. The method of claim 1, further comprising using notifications received from an agent on the mobile device to determine the location of the mobile device.

5. The method of claim 4, wherein the agent is configured to start a specific sequence of recovery actions on behalf of the subscriber when an incorrect unlock code is entered into the mobile device a certain number of times.

6. The method of claim 4, wherein the agent is configured to provide the notifications at predetermined intervals based on battery life of the mobile device.

7. The method of claim 1, further comprising charging for the notification of the location.

8. The method of claim 1, wherein the computer infrastructure is at least one of maintained, deployed, created and supported by a service provider.

9. The method of claim 1, wherein the method is implemented in the computer infrastructure having computer executable code tangibly embodied on a computer readable storage medium device having programming instructions operable to perform the steps of claim 1.

10. The method of claim 1, wherein the agent is configured to take into account battery life of the device when providing the continuous notifications.

11. The method of claim 1, wherein the location dips are performed to locate and recover SIP (Session Initiation Protocol) and non SIP-enabled devices using an IMS compliant presence server.

12. The method of claim 1, wherein a SIP application server (SIP A/S) subscribes to presence updates wherein the mobile device periodically sends location information to the SIP A/S for recovery.

13. The method of claim 1, wherein the location dips are performed by the mobile device that is not GPS enabled and A-GPS over IMS and non-IMS networks.

14. The method of claim 1, wherein the location dips are performed by the mobile device that is not GPS aware to perform both cell sector and precise fixes, while optimizing network resource usage.

15. A computer program product comprising a computer usable storage medium device having readable program code tangibly embodied in the storage medium device, the computer program product being operable to:
receive continuous notifications from an agent residing on a mobile device;
utilize a carrier location platform to perform both cell sector and precise fixes;
determine a location of the mobile device based on the continuous notifications using at least one of pattern matching of historical information or existing location information services which are repurposed for a device recovery, wherein existing location services allow leverage location dips to be performed for existing presence and location traffic other than for the device recovery which can be repurposed in order to drive a recovery process for the mobile device thereby reducing resource overhead on a location platform; and
send a notification of the location to a subscribing user in order to recover the mobile device which is optimized based on battery life of the mobile device.

16. The computer program product of claim 15, wherein the computer program product is further operable to:
leverage location dips performed for other services to drive a recovery process for the mobile device.

17. The computer program product of claim 15, wherein the computer program product is further operable to:
locate the mobile device using the location dips performed for other services.

18. The computer program product of claim 17, wherein the computer program product is further operable to:
send a notification to the subscribing user for recovery of the mobile device.

19. The computer program product of claim 15, wherein the computer program product is further operable to maintain track of presence information of the mobile device and reuse the presence information to store location information, which is updated anytime the mobile device makes a location request.

20. The computer program product of claim 15, wherein the computer program product is further operable to use pattern matching based on usage/location of the mobile device during predetermined time periods to drive the recovery and which is configured to reduce resource overhead on a location platform.

21. The computer program product of claim 15, wherein the agent is configured to start a specific sequence of recovery actions on behalf of the subscribing user.

22. The computer program product of claim 15, wherein the computer program product is provided on a computer infrastructure which is at least one of maintained, deployed, created and supported by a service provider on a fee and/or subscription basis.

* * * * *